April 26, 1966
P. E. WILLMAN
3,247,779
BROILER-ROTISSERIE
Filed Aug. 31, 1964
2 Sheets-Sheet 1
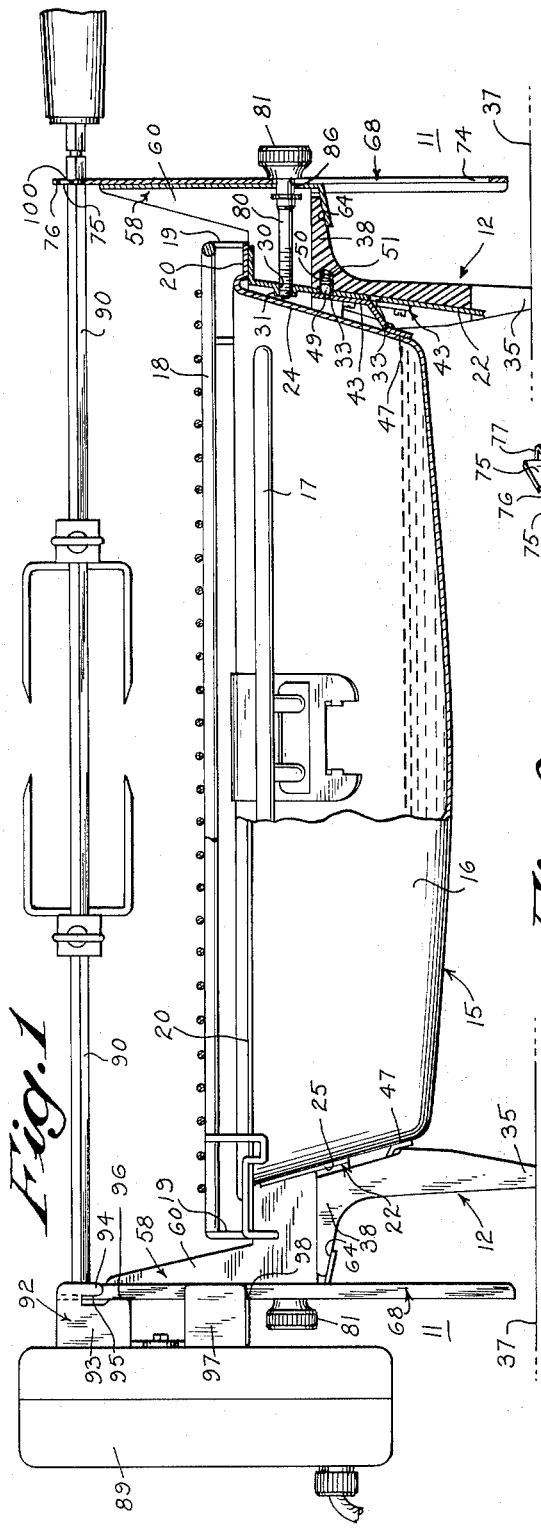
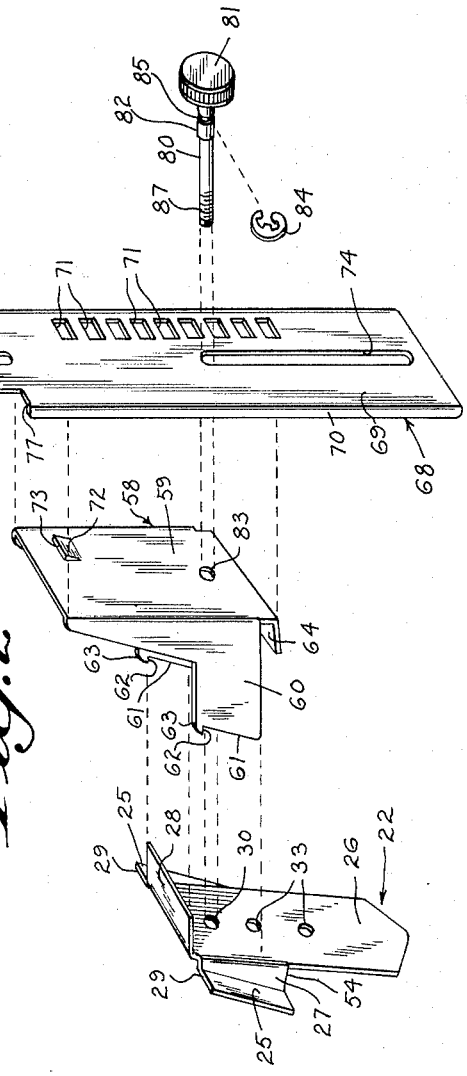
INVENTOR
PHILIP E. WILLMAN
BY *Robert W. Palatine*
ATTORNEY April 26, 1966 P. E. WILLMAN 3,247,779
BROILER-ROTISSERIE
Filed Aug. 31, 1964 2 Sheets-Sheet 2
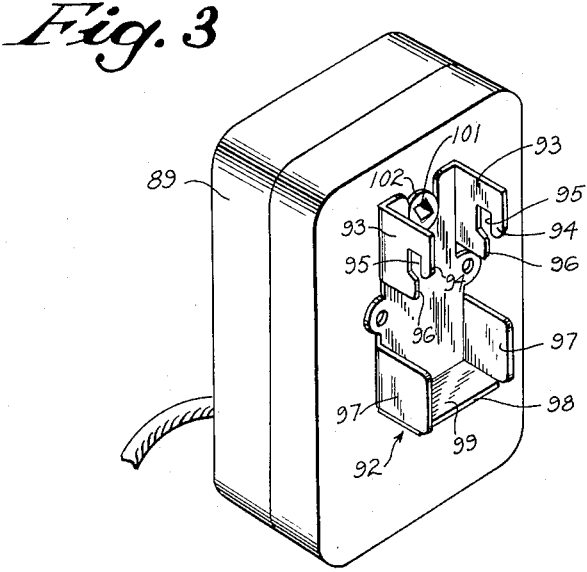
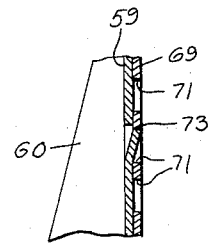
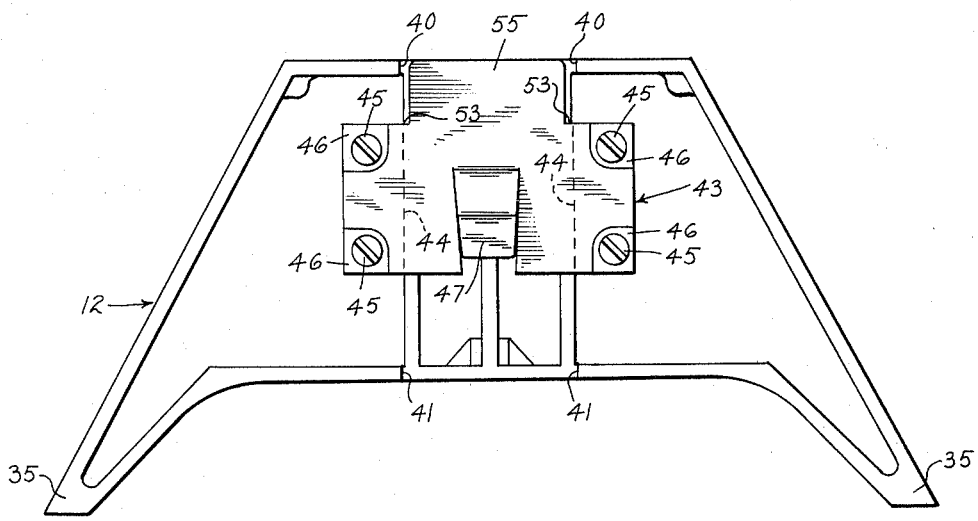
INVENTOR
PHILIP E. WILLMAN
BY
ATTORNEY 3,247,779
BROILER-ROTISSERIE
Philip E. Willman, St. Charles, Ill., assignor to McGraw-Edison Company, Milwaukee, Wis., a corporation of Delaware
Filed Aug. 31, 1964, Ser. No. 393,218
11 Claims. (Cl. 99—421)

This invention relates to a broiler-rotisserie and more specifically to the support structuer for a portable broiler-rotisserie.

A support structuer for a boiler-rotisserie should possess a simplicity of assembly and disassembly that requires no more than casual visual observation for a clear understanding of its operation; should provide sufficient structure so that it can be quickly and expeditiously put together, taken apart, or adjusted without repetitive attempts to align and adjust; and utilize manufacturing processes and materials that render the design sufficiently reasonable in cost to be economically attractive. Further such a support should be rigid and firm to securely hold articles being broiled without wobbling or danger of dropping.

The applicant has created a structure wherein support legs are assembled by sliding a plate attached to a broiler vessel into a guideway formed in the support leg to the limit of travel. The rotisserie supporting bracket is guided into position by confining surfaces of the handle and pan rim in the vertical direction and a raised section of the attaching member secured to broiler in horizontal direction. A single threaded member carrying a knurled knob both secures the bracket and affords height adjustment of the spit. It also locks the parts together rigidly. Further, the mounting members utilize few parts and are formed by economical fabricating methods with all of the parts interchangeable end for end.

It is an object of this invention to provide an improved rotisserie supporting bracket fabricated by economical forming operations.

It is a further object of this invention providing a rotisserie supporting bracket readily engageable and disengageable from the broiler assembly with all removable bracket parts held captive as a single assembly.

It is a further object of this invention to provide a rotisserie structure that is vertically adjustable but wherein no portion is allowed to depend to engage or strike the supporting surface.

It is also an object of this invention to provide an improved removable handle that is more sturdy and more rigid without additional parts.

It is also an object of this invention to provide appliance support legs and handles held captive to the appliance when the rotisserie support bracket is connected thereto.

It is also an object of this invention to provide a broiler-rotisserie support structure having common parts in each supporting structure whereby the support members are interchangeable end for end.

These and other objects and advantages of this invention will become apparent from the following description when taken in connection with the accompanying drawing, wherein:

FIGURE 1 is a front elevation of a broiler rotisserie, partly broken away and partly in section, which incorporates the support structure of this invention;

FIGURE 2 is an exploded perspective view of the rotisserie support structure and mounting plate member carried by the broiler assembly;

FIGURE 3 is a perspective view of the spit motor and mounting bracket therefor;

FIGURE 4 is an elevation view of one of the removable support legs of this invention as seen from the side facing the broiler assembly; and FIGURE 5 is a section view showing the pawl that interlocks the vertically adjustable rotisserie support bracket components.

Referring to FIG. 1, a portable broiler-rotisserie is shown having a pair of support bracket assembles 11 and a pair of broiler support legs 12 which support the unit at each longitudinal end. The support bracket 11 and support leg 12 are formed of identical parts which may be attached at either end of the appliance. The legs and support bracket at the left side of FIG. 1 are shown as a full view side elevation whereas the right side of FIG. 1 shows the same parts in section to illustrate the cooperation. The broiler unit 15 comprises a drip pan 16 within which is supported a heating element 17 and above the open top of which an article supporting grid 18 is supported by depending members 19 that engage the horizontal rim 20 of the drip pan. The broiler unit 15 is more completely described in the co-pending application Serial No. 398,691 assigned to a common assignee.

The broiler assembly 15 is supported in an elevated position by a pair of removable support legs 12 which attach to a plate member 22 (FIG. 2). The plate member 22 is secured to the broiler drip side wall 24 by welding the flanges 25, which project away from one another, flush against the surface of the side wall. Between the flanges 25 is a central generally vertical planar portion 26 connecting with the flanges by a pair of web portions 27 (only one of which is visible) and depending downwardly from the web portions as a cantilevered plate. At the upper end of the plate member 22 is an outwardly projecting horizontal flange 28 that is welded to the drip pan rim 20 to provide additional rigidity. It will be noted that the upper edge surfaces 29 of the flanges form a narrow ledge surface projecting from side wall 24 of the drip pan 16. An aperture 30 is pierced through the plate member to form a short interior cylindrical surface 31 which is internally threaded and therebelow a pair of apertures 33 are punched from the plate member 22.

Each supporting leg 12 (also shown in FIG. 4) has two horizontally spaced feet 35 that engage the supporting surface 37 and a horizontal projecting portion 38 that serves as a handle for carrying the appliance. As seen in FIG. 4 the support leg has a vertically extending recessed portion between the surfaces 40 at the top and the surfaces 41 at the lower portion of the support leg. A plate 43 overlies the recess portion and cooperates therewith to form a guideway with open upper and lower ends. To form this guideway the plate is secured to the support leg portions which underlie the side portions of the plate laterally outward of the dashed lines 44 by four self-tapping screws 45. Each corner of the plate 43 has an inwardly embossed portion 46 that conforms to a cooperating embossment in the underlying handle portions to facilitate accurate positioning during factory assembly of the support leg 12. A lower central portion of the plate 43 is pierced and bent outwardly from the handle inwardly of the margins of the guideway to present a surface portion 47 that abuts the drip pan side wall to provide additional supporting engagement in the fully assembled condition. A ball 49 is carried by the support leg in a cylindrical depression 50 confronting the guideway and is urged toward the inner surface of the plate 43 by a compression spring 51. The support legs 12 are connected to the drip pan 16 by sliding the depending portion of the plate 26 into the guideway until the upper edge surfaces 53 of the plate engage the lower edges 54 of the plate member flanges 27, at which time the upper projection 55 of plate 43 projects between the web portions 27 and the ball 49 engages the aperture 33 and cooperates therewith as a spring loaded detent structure.

The rotisserie support brackets 11 include an attachment bracket 58 that has a generally channel shaped horizontal cross section with a web portion 59 and a pair of flange portions 60. In the assembled condition the flange portion edge surfaces 61 abut the surfaces of the plate member flanges 25 with the lower surface 62 of the flange projection 63 abutting the ledge provided by the upper edge surfaces 29 of the plate member flanges 25. When the user ataches the rotisserie support bracket 11 to the broiler unit 15 the attachment bracket flanges 60 are guided to the proper position by being vertically confined by the drip pan rim 20 and the upper surface of the support leg handle projection 38 and horizontally aligned by embracing the exterior surfaces of the plate member web portion 27. When the associated support leg 12 is connected to the broiler unit 15 in the normal position as indicated in FIG. 1, the inwardly turned lower flange 64 of the attachment bracket 58 underlies the handle portion 38 to hold the support leg 12 captive with respect to both the broiler unit 15 and the associated rotisserie support bracket 11. The firm engagement of the support leg handle portion 38 between the attachment bracket flanges 60 and turned flange 64 integrates the support leg and support bracket structures into a cooperating single rigid support of increased usable load carrying capacity.

The vertically adjustable attachment plate 68 has a web portion 69 which abuts the attachment bracket web portion 59 in the assembled condition and flanges 70 which telescope over the flanges 60 of the attachment bracket 58. A series of vertically aligned rectangular apertures 71 are selectively engageable with a tab or pawl 72 (FIG. 5) sheared from the attachment bracket web 59 and bent outward to present an upper surface 73 that abuts the downwardly facing upper surface of any selected one of the apertures 71. Also formed in the web portion 69 is a vertically extending elongated aperture 74 and a pair of projecting portions 75 at the upper extremity of the plate which are separated by a U-shaped surface 76 with a horizontal edge surface 77 intermediate each projection 75 and the adjacent flange 70.

The attachment bracket 58 and the attachment plate 68 are secured to one another and to the plate member by a rod 80 which has a knurled knob 81 as an integral part therof. The enlarged shaft portion 82 extends through the elongated attachment plate aperture 74 and an aperture 83 in the attachment bracket 58 with a generally E-shaped spring washer 84 mounted in an annular grove 85 to retain the attachment plate and the attachment bracket captive to the rod by confnement between the knob shoulder 86 and the spring washer 84. Sufficient axial clearance is provided to permit the attachment plate 68 to move vertically with respect to the attachment bracket 58 when the rotisserie support bracket assembly 11 is not secured or only loosely secured to the broiler assembly 15. The rod 80 has a threaded end 87 which is received by the threaded plate member cylindrical surface 31 to draw the shoulder of knob 81 into firm engagement with the attachment plate 68, compressively securing the attachment bracket 58 between the attachment plate and the plate member 22 and retain the rotisserie support assembly component members in a fixed position with respect to the broiler unit 15. In FIG. 1 the attachment plate 68 is shown in its lowermost adjusted position with the upper surface defining the elongated aperture 74 abutting the rod 80. In this position the lowermost projection of the attachment plate is maintained above the support surface 37 to prevent the attachment plate from resting on or striking the support surface during any condition of use or adjustment.

In FIG. 3 the motor 89 which rotates the spit 90 is shown with the mounting bracket 92 bolted thereto. The bracket is formed with a single piece of stamped material with a pair of upper flanges 93 that carry downwardly opening hook portions 94 which go over and engage the upper attachment plate surfaces 77 outwardly of upper projecting portions 75 and inwardly of the flanges 70 with the inner and outer surfaces of web 69 respectively abutting the bracket edge surfaces 95 and 96. A pair of lower flanges 97 telescope over the exterior surfaces of the attachment plate 70 and the edge surface 98 of the lower upwardly turned portion 99 abuts the exterior surface of web 69. The spit 90 has an annular groove 100 adjacent the handle that engages the U-shape surface 76 and a square end (not shown) that is received in the square section cavity 101 in the motor drive coupling 102.

With the rotisserie support bracket assembly 11 removed the support legs 12 are assembled and disassembled by applying a force in the direction of the guideway. The bracket assembly, with the support leg 12 in its fully assembled condition, is guided to the correct position by vertical confinement between the pan rim 20 and the surface of the handle 38 and horizontally aligned by the exterior surfaces of the plate member connecting web portions 27. The rod is thereby aligned with the threaded aperture 30 in plate 22 and need only be turned to a position of firm engagement. The motor mounting bracket 92 is readily guided into correct alignment by the upper projecting portions 75 of the attachment plate 68 with its weight carrying the lower flanges 97 into a telescope relation with the attachment plate.

Although but one embodiment has been shown and described, it will be apparent to those skilled in the art that various changes and modifications may be made therein without departing from the spirit of the invention or from the scope of the appended claims.

What is claimed is:

1. A support structure for a portable broiler-rotisserie including a broiler assembly having a side wall, comprising a plate member secured to said side wall having side wall abutting flanges and a central raised portion; an attachment bracket of generally channel shaped section having a pair of flange portions with edge surfaces that respectively abut the surfaces of said plate member flanges, projections on each said flange portions upwardly of said edge surfaces that engage the edge surfaces of said plate member flanges, and interior flange surfaces that embrace said plate member raised central portion; and releasable securing means compressively maintaining said attachment bracket in contacting relation with said plate member.

2. A support structure for a portable broiler-rotisserie including a broiler assembly having a side wall, comprising a plate member secured to said side wall having side wall abutting flanges and a raised intermediate portion; an attachment bracket of generally channel shaped section with a vertically disposed web portion and flange portions presenting confronting surfaces embracing said plate member raised portion and flange edge surfaces respectively abutting said plate member flanges; an attachment plate of generally channel shaped section telescoped over said attachment bracket with the interior web and flange surfaces thereof abutting the exterior surfaces of the corresponding web and flange surfaces of said attachment bracket; cooperating positioning means respectively presented by said attachment bracket and said attachment plate for retaining said attachment plate in a pre-selected position of vertical adjustment with respect to said attachment bracket; and releasable connecting means drawing said attachment plate towards said plate member with said attachment bracket compressively retained therebetween.

3. A support structure for a portable broiler-rotisserie including a broiler assembly having a side wall, comprising a plate member secured to said side wall having side wall abutting flanges and a raised intermediate portion; an attachment bracket of generally channel shaped section with a vertically disposed web portion and flange portions presenting confronting surfaces embracing said plate member raised portion and flange edge surfaces respectively abutting said plate member flanges; an attachment plate of generally channel shaped section telescoped over said attachment bracket with the interior web and flange surfaces thereof abutting the exterior surfaces of the corresponding web and flange surfaces of said attachment bracket; a series of vertically aligned apertures in one of said web portions; a projecting portion carried by the other of said web portions projecting toward said one web portion and selectively engageable with said one of said apertures to retain said attachment plate in one of a plurality of vertically aligned positions with respect to said attachment bracket; and releasable connecting means drawing said attachment plate towards said plate member with said attachment bracket compressively retained therebetween.

4. A support structure for a portable broiler-rotisserie including a broiler assembly having a side wall, comprising a plate member secured to said side wall having side wall abutting flanges and a raised intermediate portion; an attachment bracket of generally channel shaped section with a vertically disposed web portion and flange portions presenting confronting surfaces embracing said plate member raised portion and flange edge surfaces respectively abutting said plate member flanges; an attachment plate of generally channel shaped section telescoped over said attachment bracket with interior web and flange surfaces thereof abutting the exterior surfaces of corresponding web and flange surfaces of said attachment bracket; cooperating positioning means respectively presented by said attachment bracket and said attachment plate for retaining said attachment plate in a preselected position of vertical adjustment with respect to said attachment bracket; a threaded first aperture in said plate member; a second aperture in said attachment bracket web portion; a vertically extending slotted third aperture in said attachment plate; a securing member including a rod extending through said second and third apertures with a threaded end portion received in said first aperture and an enlarged portion presenting a shoulder abutting said attachment plate for drawing said attachment plate towards said plate member as said threaded rod portion is received by said first aperture and compressively retaining said attachment bracket between said plate member and said attachment plate.

5. A support structure for a portable broiler-rotisserie which includes a broiler assembly comprising a member carried by said broiler assembly at one side thereof that presents a side surface and a horizontal ledge surface; an attachment bracket of generally channel shaped section having a pair of flange portions with edge surfaces abutting said side surface and projecting portions overlying and abutting said ledge surface; an attachment plate of generally channel shaped section with flange portions telescoped over the flange portions of said attachment bracket; cooperating positioning means respectively presented by said attachment bracket and said attachment plate for retaining said attachment plate in a pre-selected position of vertical adjustment with respect to said attachment bracket; and releasable connecting means drawing said attachment plate toward said broiler assembly member with said attachment bracket compressively retained therebetween.

6. A support structure for a portable broiler-rotisserie which includes a broiler assembly, comprising a member carried by said broiler assembly at one side thereof that presents a side surface and a horizontal ledge surface; an attachment bracket of generally channel shaped section having a pair of flange portions with edge surfaces abutting said side surface and projecting portions overlying and abutting said ledge surface; an attachment plate of generally channel shaped section with flange portions telescoped over the flange portions of said attachment bracket; a vertically extending web portion intermediate the flanges of said attachment bracket; a web portion intermediate the flanges of said attachment plate and abutting said attachment bracket web portion; a series of vertically aligned apertures in one of said web portions; and a projection carried by the other of said web portions which projects toward said one web portion and is selectively engageable with said apertures to vary the relative vertical position of said attachment plate with respect to said attachment bracket; and releasable connecting means drawing said attachment plate toward said broiler assembly member with said attachment bracket compressively retained therebetween.

7. A support structure for a portable broiler-rotisserie which includes a broiler assembly comprising a member carried by said broiler assembly at one side thereof that presents a side surface and a horizontal ledge surface; an attachment bracket of generally channel shaped section having a pair of flange portions with edge surfaces abutting said side surface and projecting portions overlying and abutting said ledge; an attachment plate of generally channel shaped section with flange portions telescoped over the flange portions of said attachment bracket; co-operating positioning means respectively presented by said attachment bracket and said attachment plate for retaining said attachment plate in a preselected position of vertical adjustment with respect to said attachment bracket; a threaded first aperture in said broiler assembly member between said attachment bracket abutting edge surfaces; a second aperture in said attachment bracket axially aligned with said first aperture and a slotted vertically extending third aperture in said attachment plate; an attachment means including a rod extending through said second and third apertures with a threaded end received in said first aperture and a shoulder portion engaging said attachment plate to draw said plate toward said broiler assembly member with said attachment bracket retained therebetween.

8. A support structure for a portable broiler-rotisserie including a broiler assembly comprising a plate member secured to said assembly at one side thereof with a cantilevered downwardly depending portion; a support leg having a guideway formed therein slidably receiving said plate member depending portion to support said assembly in an elevated position; an attachment bracket having a vertical web portion and a pair of flange portions projecting therefrom toward said plate member with flange edge portions abutting the surface of said plate member and projecting portions abutting an edge of said plate member; an attachment plate of generally channel shape with a web portion abtutting said attachment bracket web portion and flange portions telescoped over said attachment bracket flange portions; and releasable connecting means drawing said attachment plate toward said plate member with said attachment bracket retained therebetween and releasably securing said attachment plate in a fixed position with respect to said broiler assembly.

9. A support structure for a portable broiler-rotisserie including a broiler assembly, comprising a plate member secured to said assembly at one side thereof with a cantilevered downwardly depending portion; a support leg having a guideway formed therein slidably receiving said plate member depending portion to support said assembly in an elevated position; said support leg guideway being formed by a recess in said support leg with an overlying plate secured to said leg, said overlying plate having a lower portion of said plate intermediate of margins of said guideway turned away from said support leg and engaging said broiler assembly; an attachment bracket having a vertical web portion and a pair of flange portions projecting therefrom toward said plate member with flange edge portions abutting the surface of said plate member and projecting portions abutting an edge of said plate member; an attachment plate of generally channel shape with a web portion abutting said attachment bracket web portion and flange portions telescoped over said attachment bracket flange portion; and releasably connecting means drawing said attachment plate toward said plate member with said attachment bracket retained therebetween and releasably securing said attachment plate in a fixed position with respect to said broiler assembly.

10. A support structure for a portable broiler-rotisserie including a broiler assembly, comprising a plate member secured to said assembly at one side thereof with a cantilevered downwardly depending portion; a support leg having a guideway formed therein slidably receiving said plate member depending portion to support said assembly in an elevated position; an attachment bracket having a vertical web portion and a pair of flange portions projecting therefrom towards said plate member with flange edge portions abutting the surface of said plate member and projecting portions abutting an edge of said plate member; an attachment plate of generally channel shape with web portion abutting said attachment bracket web portion and flange portions telescoped over said attachment bracket flange portions; a first aperture in said attachment bracket web portion; a vertically extending slotted second aperture in said attachment plate web portion; an attachment plate abutting member; connecting rod means projecting through said first and second apertures and operatively releasably interconnecting said attachment plate abutting member and said broiler assembly to compressively retain said attachment plate and attachment bracket therebetween.

11. The support structure of claim 10 wherein the attachment plate in the position of maximum downward adjustment depends downwardly a lesser distance than said support leg.

References Cited by the Examiner

UNITED STATES PATENTS

| | | | |
|---|---|---|---|
| 846,022 | 3/1907 | Ficener | 248—224 X |
| 2,505,976 | 5/1950 | Leon | 99—421 |
| 2,845,856 | 8/1958 | Sack | 99—421 |
| 2,936,146 | 5/1960 | Wunder | 248—223 |
| 2,961,942 | 11/1960 | Terry | 99—340 |
| 3,074,680 | 1/1963 | Stewart | 248—224 |

WALTER A. SCHEEL, *Primary Examiner.*

STANLEY P. FISHER, *Assistant Examiner.*